United States Patent [19]
Suzuki

[11] Patent Number: 5,799,262
[45] Date of Patent: Aug. 25, 1998

[54] CONSTANT SPEED CONTROL SYSTEM FOR ELECTRIC VEHICLE AND THE METHOD THEREOF

[75] Inventor: Akira Suzuki, Tochigi, Japan

[73] Assignee: Fuji Jukogyo Kabushiki Kaisha, Tokyo, Japan

[21] Appl. No.: 589,465

[22] Filed: Jan. 22, 1996

[30] Foreign Application Priority Data

Feb. 10, 1995 [JP] Japan .................. 7-023057

[51] Int. Cl.$^6$ .......................... B60K 31/04
[52] U.S. Cl. ............ 701/93; 701/22; 180/65.8; 180/179
[58] Field of Search ............ 364/426.041, 426.042, 364/431.07, 426.01, 424.026; 180/170, 179, 65.1, 65.8, 65.3; 123/350, 352; 701/70, 22, 93, 94, 110

[56] References Cited

U.S. PATENT DOCUMENTS

| | | |
|---|---|---|
| 5,096,015 | 3/1992 | Akishino et al. ............ 364/426.041 |
| 5,161,634 | 11/1992 | Ichihara et al. ............ 364/426.041 |
| 5,581,465 | 12/1996 | Adler et al. ............ 364/426.041 |
| 5,625,558 | 4/1997 | Togai et al. ............ 364/426.041 |

*Primary Examiner*—Gary Chin
*Attorney, Agent, or Firm*—Beveridge, DeGrandi, Weilacher & Young, LLP

[57] ABSTRACT

Disclosed is a system and method for controlling a vehicle speed of an electric vehicle so as to be operated at a designated constant vehicle speed. When the constant speed running mode is selected and the vehicle speed is designated to a given vehicle speed, a motor torque needed for the constant speed running is instructed to a motor controller. When an accelerator pedal is depressed during the constant speed running, the motor torque is compared with an accelerator torque corresponding to the amount of depression of the accelerator pedal. If the accelerator torque is larger than the motor torque, the vehicle is accelerated and if the accelerator torque is smaller than the motor torque, the vehicle is kept running at or is returned to the designated constant speed, thereby a smooth passing or lane changing during the constant speed running can be made.

4 Claims, 9 Drawing Sheets

CONSTANT SPEED CONTROL SYSTEM FOR ELECTRIC VEHICLE AND THE METHOD THEREOF

BACKGROUND OF THE INVENTION

1. Field of the Invention

The present invention relates to a constant speed control system for an electric vehicle and the method thereof and particularly to a constant speed control system and method capable of operating an electric vehicle at a designated constant speed by controlling an output torque of a driving motor.

2. Prior Arts

In recent years, more vehicles have been furnished with a constant speed control system (hereinafter, referred to as a cruise control system) which can operate vehicles automatically at constant speeds without pressing on the accelerator pedal when desired speed is set by a vehicle operator.

Figure 11:
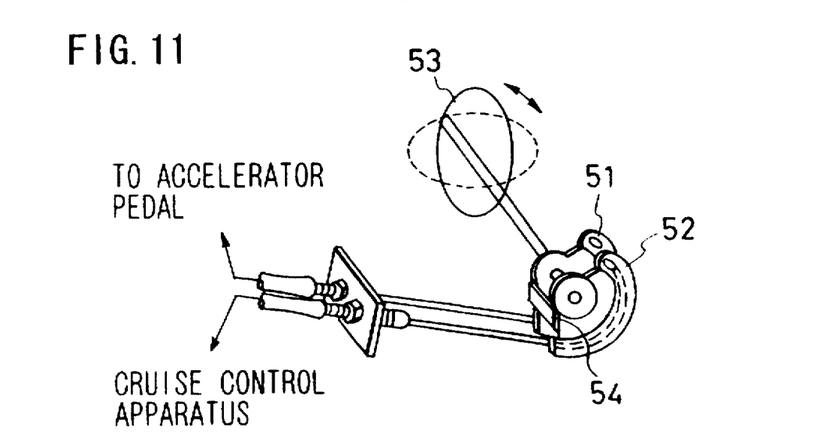
FIG. 11 is a schematic view showing a portion of a throttle cam of a conventional cruise control apparatus for a gasoline fueled vehicle.

The cruise control system for a gasoline fueled vehicle is constituted so as to maintain the vehicle at a predetermined speed (a speed desired by a vehicle driver) by means of controlling the opening angle of the throttle valve based on a vehicle speed signal from the vehicle speed sensor. For example, referring to FIG. 11, the cruise control apparatus has a composition of double cam in which a cam 52 which is interlocked with an actuator controlled by the cruise control system is coaxially connected with a throttle cam 51 which is operated by the accelerator pedal on the throttle valve shaft 53. When the throttle cam 51 is rotated at a certain angle and more through a stopper member 54 extended from the cam 52 to the throttle cam 51, the cam 52 is also rotated to open the throttle valve 53. Thus constituted mechanism enables the vehicle to accelerate over the designated vehicle speed when the vehicle operator depresses the accelerator pedal by more than the throttle opening angle set by the cruise control and to operate at the designated vehicle speed when the vehicle operator stops to operate the accelerator pedal or when the vehicle operator depresses a little the accelerator pedal.

On the other hand, in the electric vehicle, Japanese Utility Model Application Jitsu-Ko-Sho 52-29365 discloses a cruise control system by which the vehicle can be operated automatically at a constant speed regardless of the operation of the accelerator pedal when a vehicle operator turns a change-over switch to deactivate the accelerator system.

However, in this prior art, in order to accelerate the vehicle, the vehicle operator must return the change-over switch to a normal position and after that depress the accelerator pedal for acceleration. Even with the electric vehicle, if the vehicle operator wants to accelerate more than a designated vehicle speed, it is more convenient and advantageous to be able to raise the vehicle speed according to the amount of the depression of the accelerator pedal in the same manner as in the gasoline fueled vehicle.

SUMMARY OF THE INVENTION

In view of these situations, the present invention is intended to obviate the defects of the prior art and it is an object of the present invention to provide a cruise control system capable of accelerating the vehicle by pressing on the accelerator pedal when the vehicle operator wants to obtain more speed than the designated speed during the constant speed operation of the vehicle.

A constant speed running control system of an electric vehicle for automatically operating the electric vehicle at a selectively designated vehicle speed, the vehicle having a driving motor for driving the electric vehicle, a controller for controlling the motor and an accelerator pedal for controlling the motor through the controller, comprising:

motor indication torque calculating means for calculating a motor indication torque needed when the vehicle runs at the designated vehicle speed;

accelerator indication torque calculating means for calculating an accelerator indication torque inputted from the accelerator pedal;

indication torque comparing means for judging whether or not the motor indication torque is larger than the accelerator indication torque;

constant speed running instructing means for instructing the motor indication torque to the controller so as to operate the vehicle at the designated vehicle speed when the indication torque comparing means judge that the motor indication torque is larger than the accelerator indication torque; and accelerator indication torque instructing means for instructing the accelerator indication torque to the controller so as to accelerate the vehicle when the indication torque comparing means judge that the accelerator indication torque is equal to or larger than the motor indication torque.

Also described is a method of calculating a motor indication torque needed when the vehicle runs at the designated vehicle speed; calculating an accelerator indication torque inputted from the accelerator pedal; judging whether or not the motor indication torque is larger than the accelerator indication torque; instructing the motor indication torque to the controller so as to operate the vehicle at the designated vehicle speed when it is judged that the motor indication torque is larger than the accelerator indication torque; and instructing the accelerator indication torque to the controller so as to accelerate the vehicle when it is judged that the accelerator indication torque is equal to or larger than the motor indication torque.

BRIEF DESCRIPTION OF DRAWINGS

A specific embodiment of the present invention will be described with reference to the accompanying drawings, in which.

DETAILED DESCRIPTION OF THE INVENTION

Figure 1:
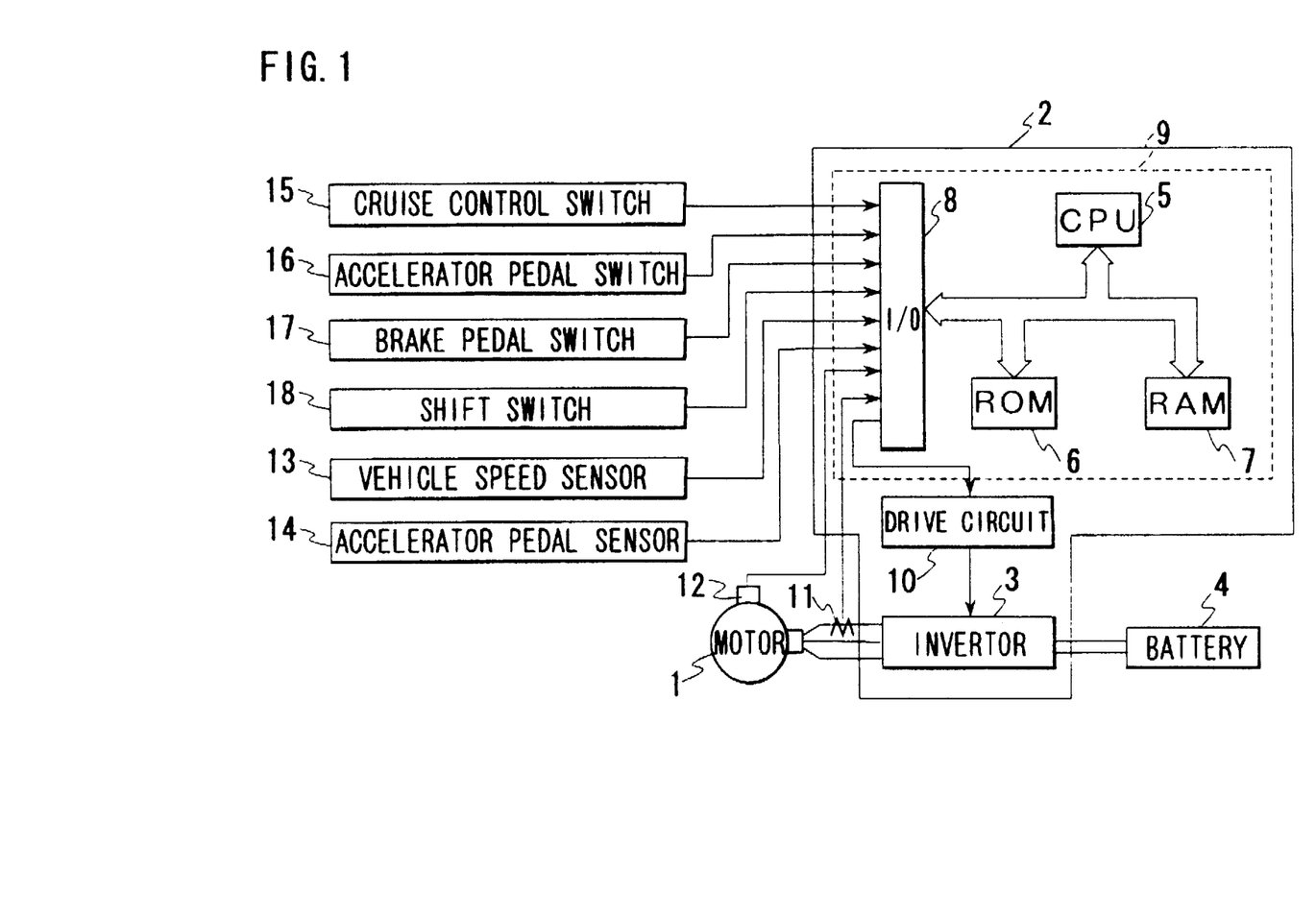
FIG. 1 is a schematic diagram of a motor control system circuit according to a first embodiment of the present invention.

Referring now to FIG. 1, numeral 1 denotes an electric driving motor (hereinafter referred to as a motor) mounted on an electric vehicle. In this embodiment, the motor is an alternating current induction motor. The motor 1 drives a transaxle (not shown) through which a front or rear axle (not shown) is driven to rotate front or rear wheels (not shown).

The motor 1 is connected with a main battery 4, a power source for driving, through an invertor 3 in a controller 2.

The controller 2 includes a micro-computer 9 comprising a CPU 5, a ROM 6, a RAM 7 and an I/O interface 8. An output port of the I/O interface 8 is connected with the invertor 3 through a drive circuit 10.

Further, the torque control of the motor 1 is performed such that the CPU 5 of the micro-computer 9 calculates a target torque and then the drive circuit 10 converts the calculated target torque into a current instruction. The current instruction outputted to the invertor 3 is converted therein into a high frequency current having a specified voltage.

On a connecting line between the motor 1 and the invertor 3, a current sensor 11 is provided for detecting driving current of the motor 1 and it is connected with the I/O interface 8 of the micro-computer 9.

Further, miscellaneous sensors and switches such as a rotational speed sensor 12 for detecting a rotational speed of the rotor of the motor 1, a vehicle speed sensor 13, accelerator pedal sensor 14 for detecting the amount of depression of the accelerator pedal, a cruise control switch 15, an accelerator pedal switch 16 which is turned on by a very small stroke applied thereto at the start of depression, a brake pedal switch 17 which is turned on by a very small stroke applied thereto at the start of depression, a shift switch 18 for detecting the position of a shift lever and the like, are connected with the micro-computer 9 through the I/O interface 8.

The cruise control switch 15 is a main switch for selecting and determining a constant speed operation of the vehicle and when it is turned on the constant speed operation mode is selected.

The brake pedal switch 17 and the shift switch 18 act as a cruise control canceling switch for canceling the constant speed operation mode when the brake pedal switch 17 is turned on or when the shift position is located at the N range.

Further, the cruise control system has functions which are not shown in the attached drawings, that is, a SET/COAST switch for reducing vehicle speed when it is turned on and for keeping the vehicle speed of when it is turned off and an ACCELERATION/RESUME switch for increasing vehicle speed when it is turned on and for keeping the vehicle speed of when it is turned off.

Figure 2:
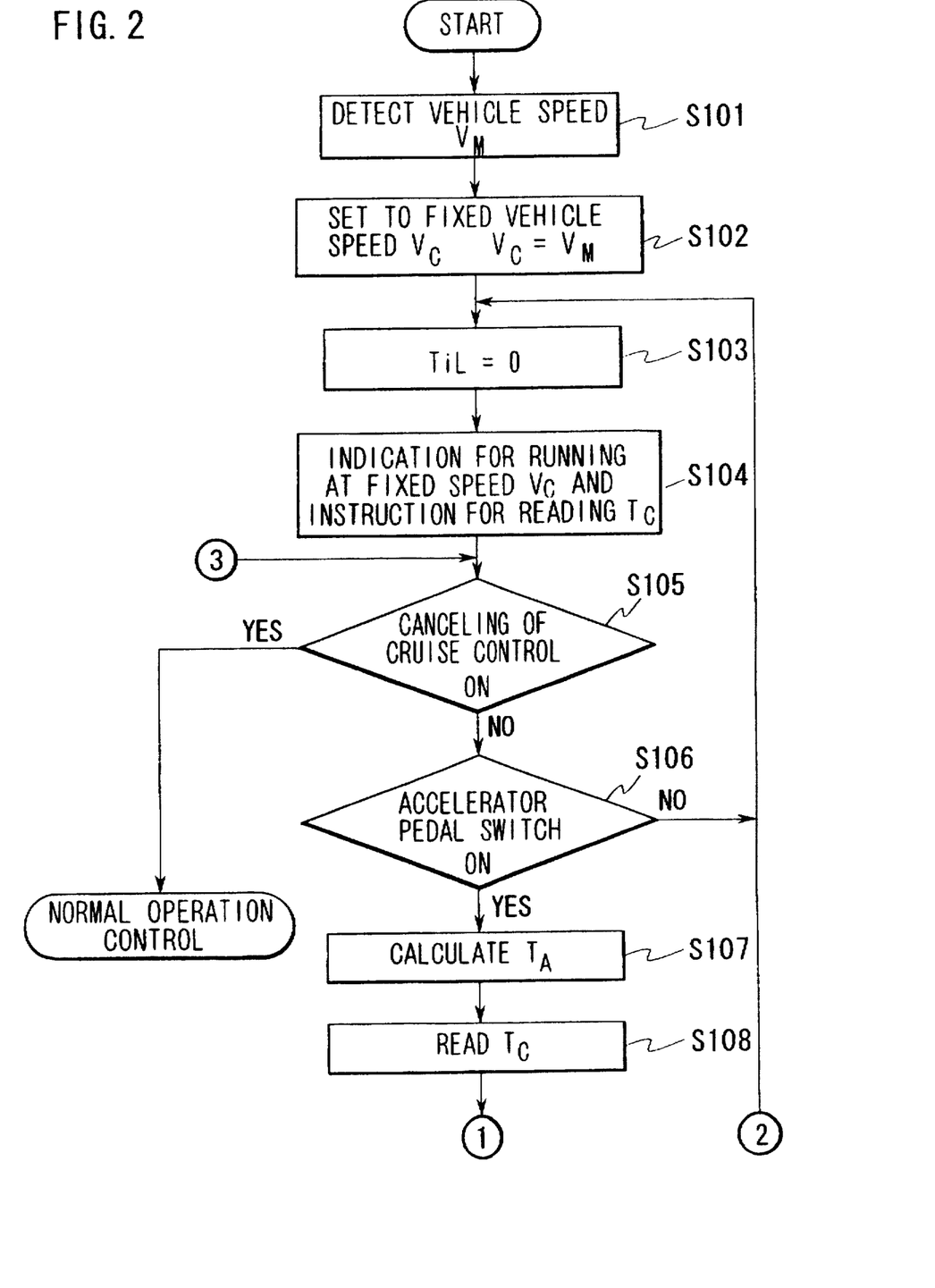
FIG. 2 is a flowchart showing a cruise control according to a first embodiment of the present invention.
Figure 3:
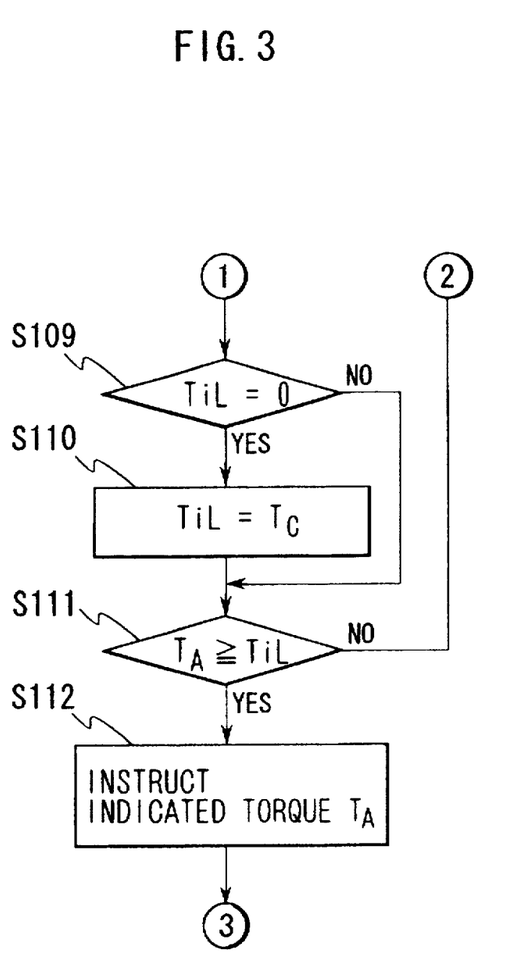
FIG. 3 is a flowchart continued from FIG. 2.

Next, the constant speed operation control when the cruise control switch 15 is set to the constant speed operation mode will be described by referring to flowcharts shown in FIG. 2, FIG. 3 and FIG. 4.

When the program starts, first at a step 101 (hereinafter referred to as S number) a vehicle speed VM is detected by a signal from the vehicle speed sensor 13.

Then, the program goes to S102 where when the SET/COAST switch or the ACCELERATION/RESUME switch is turned off, the vehicle speed VM at that time is set to a fixed vehicle speed Vc (Vc=VM) and is stored in the RAM 7.

Next, the program goes to S103 at which the memory value TiL is cleared (TiL=0) and then at S104 an indicated torque value Tc needed for running at the fixed speed Vc is read and sent to the drive circuit 10.

Figure 4:
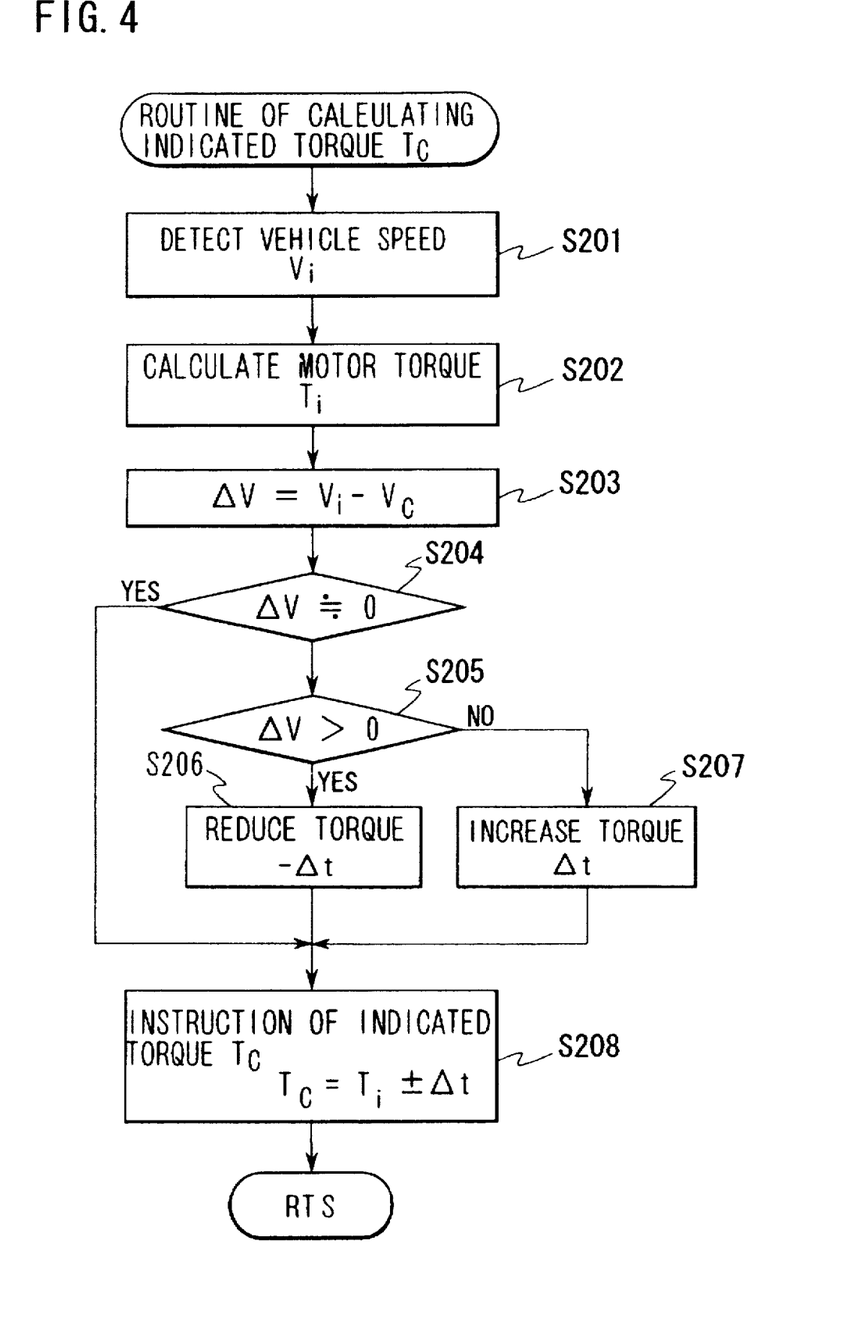
FIG. 4 is a flowchart of an indicated torque calculation routine.

The indicated torque value Tc is calculated according to a routine shown in FIG. 4. First, at S201 the current vehicle speed Vi is detected and then at S202 a motor torque Ti corresponding to the current vehicle speed Vi is calculated.

Then, at S203 a vehicle speed difference $\Delta V$ ($\Delta V = Vi - Vc$) between the current vehicle speed Vi and the fixed vehicle speed Vc is obtained and at S204 it is judged whether or not the vehicle speed difference $\Delta V$ is nearly equal to zero.

When at S204 it is judged that the vehicle speed difference $\Delta V$ is nearly equal to zero, the program skips to S208 because no correction of torque is needed.

On the other hand, when at S204 it is judged that the vehicle speed difference $\Delta V$ is not near to zero, since e the vehicle is operated at the different speed from the fixed vehicle speed Vc, the program goes to S205 where torque is corrected.

At S205 it is judged that the vehicle speed difference $\Delta V$ is positive or negative, that is, the vehicle runs at a lower or higher speed than the fixed vehicle speed Vc. When the vehicle speed difference $\Delta V$ is larger than zero, namely, when the current vehicle speed Vi is larger than the fixed vehicle speed Vc, the vehicle speed should be lowered and therefore at S206 a correction torque $-\Delta t$ for reducing torque is obtained. On the other hand, when the vehicle speed difference $\Delta V$ is smaller than zero, namely, when the current vehicle speed Vi is smaller than the fixed vehicle speed Vc, the vehicle speed should be raised and therefore at S207 a correction torque $\Delta t$ for increasing torque is obtained.

Then, at S208 the indicated torque Tc needed for running at the fixed vehicle speed Vc is calculated (Tc=Ti±$\Delta t$) and is instructed.

Next, the program goes to S105 where it is judged whether or not the cruise control has been canceled by the cruise control switch 15, the brake pedal switch 17, the shift switch 18 and others. In case where the cruise control has not been canceled, the program goes to S106 and in case where the cruise control has been canceled, the program goes to a normal manual operation control.

In case where the cruise control has not been canceled, at S106 it is judged whether or not the accelerator pedal switch 16 has been turned on, namely the accelerator pedal has been depressed. If the accelerator pedal switch 16 has been turned on, the program goes to S107 and if not, the program returns to S103.

Figure 5:
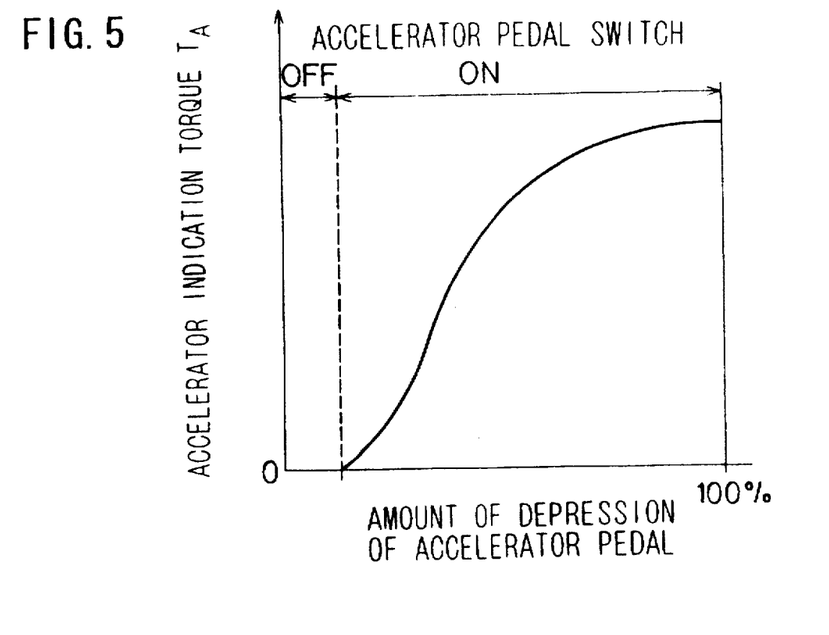
FIG. 5 is a diagram showing a relationship between an amount of depression of an accelerator pedal and an indicated torque of an accelerator sensor.

If it is judged at S106 that the accelerator pedal switch 16 has been turned on, at the next step S107 an accelerator indication torque TA or a torque indicated by the accelerator pedal sensor 14, is calculated in the micro-computer 9. The characteristics of the accelerator indication torque TA versus the amount of depression of the accelerator pedal are presented in a curve rising to the right as shown in FIG. 5.

Next, the program goes to S108 where the motor torque to realize the fixed vehicle speed Vc, namely the current indication torque Tc is read.

At S109, it is judged whether the memory value TiL is cleared (TiL=0) or not. If it is cleared (TiL=0), the program goes to S110 where the current indication torque Tc is substituted for the memory value TiL (TiL=Tc). If a value other than zero is substituted for the memory value TiL, the program skips to S111.

At S111, it is judged whether or not the accelerator indication torque TA is larger than or equal to the memory value TiL, that is, whether or not the accelerator indication torque TA inputted from the accelerator pedal is larger than or equal to the torque during the constant speed operation before the vehicle is accelerated by manual.

In other words, the memory value TiL serves as a flag to discriminate between a manual acceleration from the constant speed operation and other acceleration. Further, in other words, this memory is a memory for temporarily storing the motor torque immediately before the manual acceleration during the constant speed operation in order to compare this memory value with the accelerator indication torque TA.

In case where the accelerator indication torque TA is larger than or equal to the memory value TiL (TA $\geq$ TiL), the program goes to S112 and in case where the accelerator indication torque TA is smaller than the memory value TiL (TA <TiL), the program returns to S103.

Figure 6:
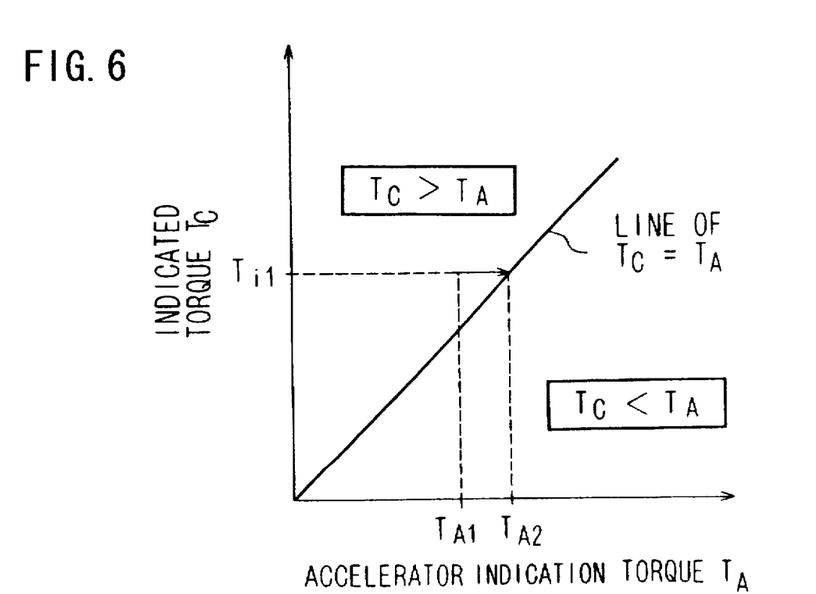
FIG. 6 is a diagram showing a relationship between an indicated torque of an accelerator sensor and an indicated torque of a motor.

Consequently, even if the accelerator indication torque TA (for example TA1) is smaller than the indicated torque Ti1 by which the fixed vehicle speed Vc is obtained, the accelerator indication torque becomes a torque TA2, the same value as Ti1. Thus, when the vehicle operator depresses the accelerator pedal to raise the vehicle speed more than the fixed vehicle speed Vc, no shortage of torque due to an insufficient amount of depression of the accelerator pedal happens.

As result of TA $\geq$ TiL, the program goes to S112 and there the accelerator indication torque TA is instructed to the drive circuit 10. At this time, the instruction of the fixed vehicle speed Vc is temporarily canceled.

Thus, according to the first embodiment, since the accelerator indication torque is compared with the indicated torque corresponding the fixed vehicle speed at S111, it is possible to accelerate the vehicle with the fixed vehicle speed retained. Further, it is possible to obtain an acceleration of the vehicle securedly if the vehicle operator depresses the accelerator pedal over the pedal position of the designated vehicle speed. This enables the vehicle driver to make a smooth passing or lane changing during the constant speed running by the cruise control.

Figure 7:
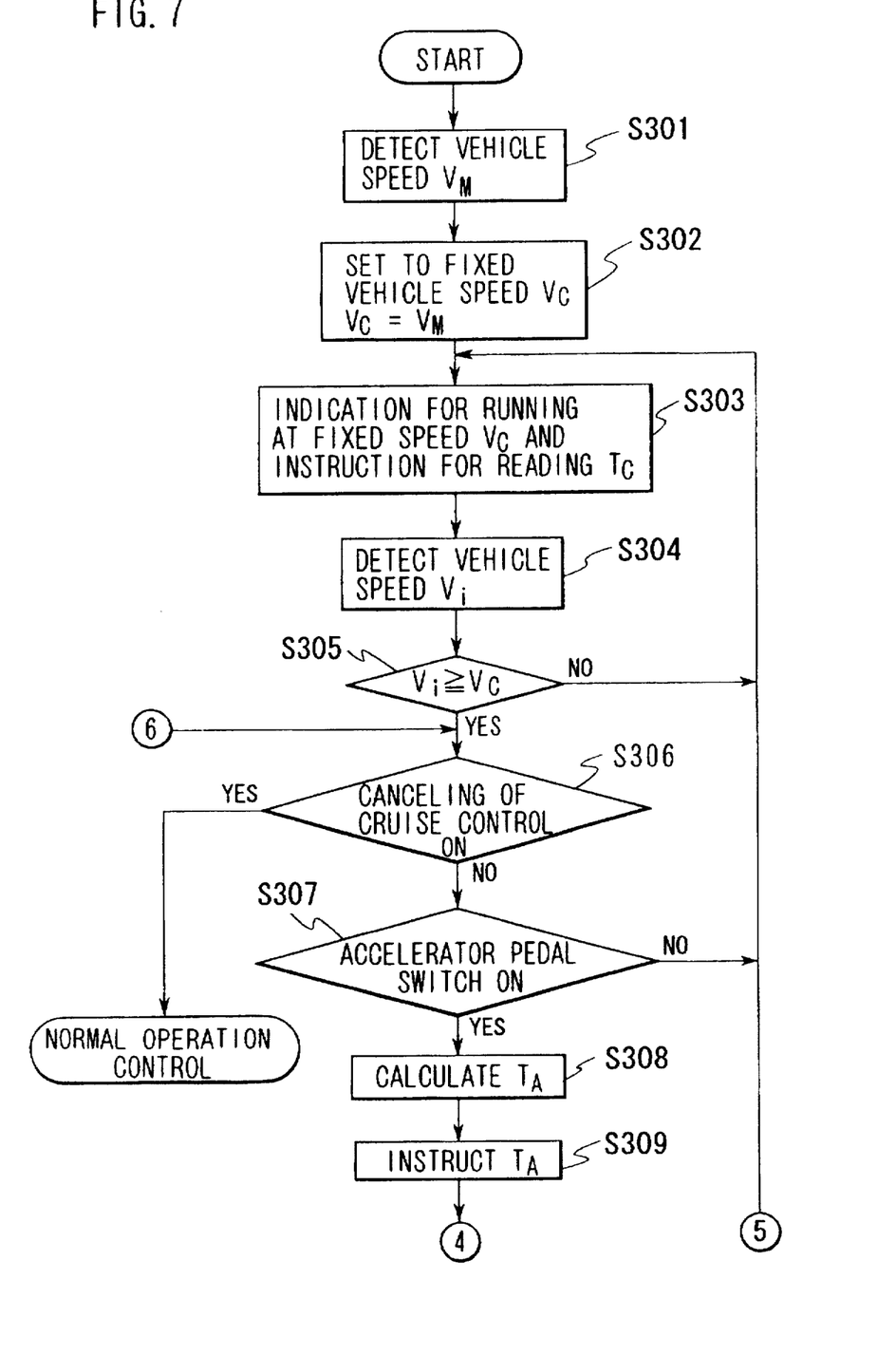
FIG. 7 is a flowchart showing a cruise control according to a second embodiment of the present invention.
Figure 8:
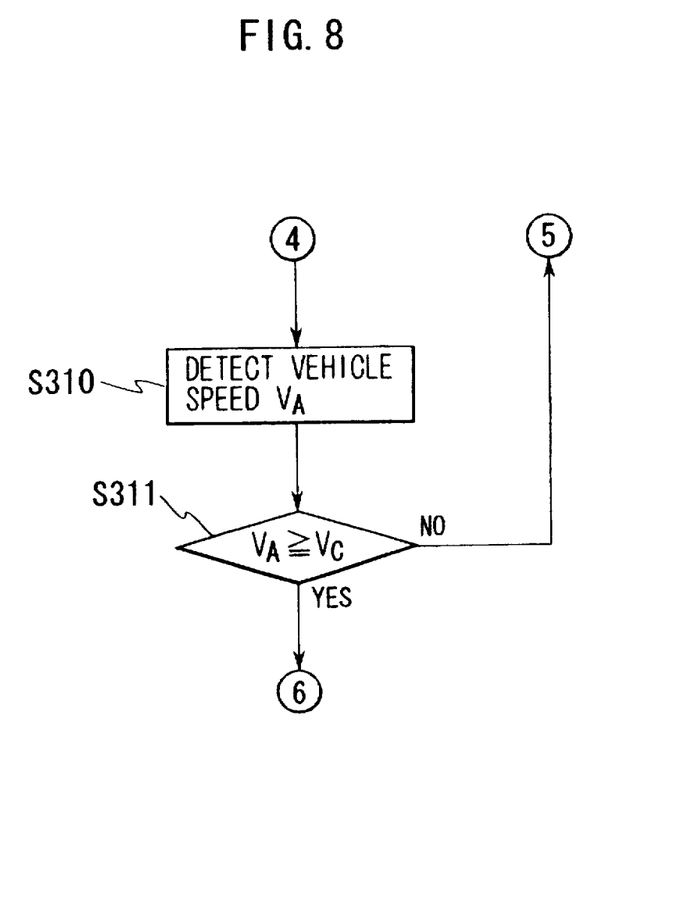
FIG. 8 is a flowchart continued from FIG. 7.

FIG. 7 and FIG. 8 show a second embodiment according to the present invention. FIG. 7 is a flowchart of the cruise control according to the second embodiment and FIG. 8 is a flowchart continued from the flowchart in FIG. 7. According to the second embodiment, after an indication torque inputted from the accelerator pedal during the constant speed operation is outputted to the motor, a detected vehicle speed is compared with a selectively designated vehicle speed. If the detected vehicle speed is larger than the selectively designated vehicle speed, the indication torque is continued to be outputted to the motor and if the detected vehicle speed is smaller than the selectively established vehicle speed, the output torque needed for the constant speed operation is outputted to the motor.

Referring now to FIG. 7 and FIG. 8, first at S301 a vehicle speed VM is detected from a signal of the vehicle speed sensor 13. Then when at S302 the SET/COAST switch or the ACCELERATION/RESUME switch is turned off, the vehicle speed VM at this moment is set as a fixed vehicle speed Vc (Vc=VM) and stored in the RAM 7.

At the next step S303, an indication torque Tc needed for running at the fixed speed Vc is read and instructed to the drive circuit 10.

Then the program goes to S304 where the current vehicle speed Vi is detected and after that at S305 it is judged whether or not the vehicle speed Vi is larger than or equal to the fixed vehicle speed Vc (Vi $\geq$ Vc). In case of Vi $\geq$ Vc, the program goes to S306 and in case of Vi <Vc, the program returns to S303.

When the program goes to S306 according to the judgment of Vi $\geq$ Vc, there it is judged by the cruise control switch 15, the brake pedal switch 17, the shift switch 18 and others whether or not the cruise control has been canceled. If the cruise control is not canceled, the program goes to S307 and if it is canceled, the program returns to the normal manual operation.

When the program goes to S307 as a result of judging that the cruise control has not been canceled at S306, it is judged whether or not the accelerator pedal switch 16 has been turned on (the accelerator pedal has been depressed). If the accelerator pedal switch 16 is turned on, the program goes to S308 and if not the program returns to S303.

If the accelerator pedal switch 16 is turned on, the program goes to S308 where a torque indicated from the accelerator pedal sensor 14, i.e., an accelerator indication torque TA is calculated by the micro-computer 9.

At the next step S309 the accelerator indication n torque TA is instructed to the drive circuit 10 and the instruction of the fixed vehicle speed Vc is canceled temporarily.

Next, the program goes to S310 where the vehicle speed VA is detected. Then, at S311 the detected vehicle speed VA is compared with the fixed vehicle speed set at S302. If VA $\geq$ Vc, the program returns to S306 and if VA <Vc the program returns to S303. That is to say, when a torque is inputted from the accelerator pedal, if the vehicle speed is increasing more than the fixed vehicle speed Vc, the torque is continued to be inputted from the accelerator pedal and if the vehicle speed is going down less than the fixed vehicle speed Vc, the instruction of the accelerator indication torque TA is canceled temporarily until the vehicle speed reaches the fixed vehicle speed Vc. Then, the program performs a closed loop routine S303 to S304 to S305 to S303 so as to maintain the fixed vehicle speed Vc.

Thus, according to the second embodiment, since the program has two vehicle speed comparisons S305 and S311, the vehicle can still hold the fixed vehicle speed Vc even if the vehicle operator flutters the accelerator pedal according to roads and traffic conditions.

Figure 9:
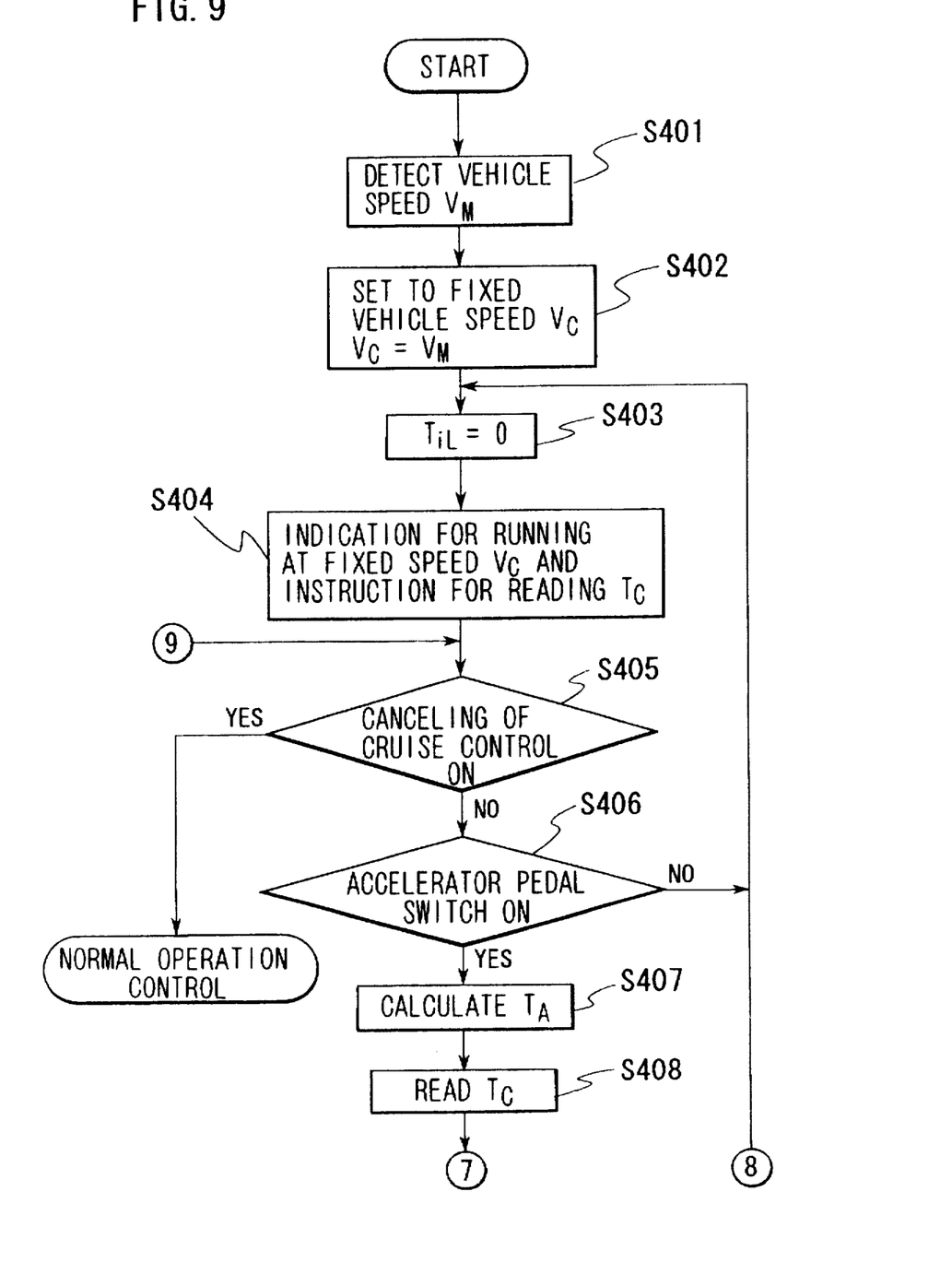
FIG. 9 is a flowchart showing a cruise control according to a third embodiment of the present invention.
Figure 10:
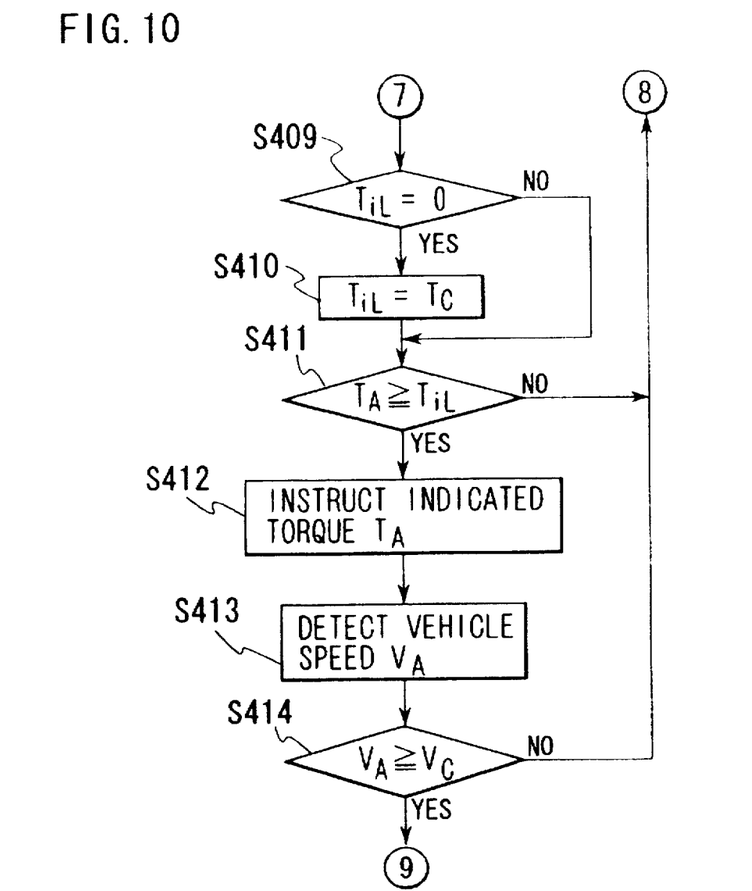
FIG. 10 is a flowchart continued from FIG. 9.

Next, FIG. 9 and FIG. 10 show a third embodiment according to the present invention. FIG. 9 is a flowchart of the cruise control and FIG. 10 is a continued one from the flowchart of FIG. 9. According to the third embodiment, first a motor torque at the constant speed running is compared with an indication torque inputted from the accelerator pedal. In case where the indication torque inputted from the accelerator pedal is above the motor torque, the indication torque is outputted to the motor. Then, after the indication torque is outputted to the motor, the vehicle speed detected is compared with the selectively designated vehicle speed. If the vehicle speed detected is more than the selectively designated vehicle speed, the indication torque is continued to be outputted to the motor. On the other hand, if the indication torque from the accelerator pedal is less than the motor torque or if the vehicle speed detected is less than the selectively designated vehicle speed, the motor torque for the constant speed operation is outputted to the motor.

Specifically, when the program starts, at S401 a vehicle speed VM is detected by a signal from the vehicle speed sensor 13 and the program goes to S402 where the SET/COAST switch or the ACCLERATION/RESUME switch is turned off to set the vehicle speed VM at that moment to the fixed vehicle speed Vc (Vc=VM), then the fixed vehicle speed Vc being stored in the RAM 7.

Next, after the memory value TiL is cleared (TiL=0) at S403, the program goes to S404 where an indication torque Tc needed for running at the fixed vehicle speed Vc obtained according to the flowchart in FIG. 4 is read and is instructed to the drive circuit 10.

Next, the program goes to S405 where it is judged whether or not the cruise control is canceled by the cruise control switch 15, the brake pedal switch 17 and the shift switch 18. In case where the cruise control is not canceled, the program goes to S406 and in case where the cruise control is canceled, the program return to the normal manual control.

When it is judged at S405 that the cruise control is not canceled and the program goes to S406, it is judged whether or not the accelerator pedal switch 16 is turned on (the accelerator pedal is depressed). If the accelerator pedal switch 16 is turned on, the program steps to S407 and if the accelerator pedal switch 16 is turned off, the program returns to S403.

When the program steps to S407, a torque indicated from a signal of the accelerator pedal sensor 14, that is, an accelerator indication torque TA is calculated in the microcomputer 9.

Next, the program goes to S408 in which the motor torque established so at to obtain the fixed vehicle speed Vc, namely, the current indication torque Tc is read and steps to S409.

At S409, it is judged whether or not the memory value TiL is cleared (TiL=0). If the memory value is cleared (TiL=0), the program goes to S410 where the the current indication torque Tc is substituted for the memory value TiL (TiL=Tc) and goes to S411. If at S409 other value is substituted for the memory value TiL, the program skips to S411.

When the program goes to S411, there it is judged whether or not the accelerator indication torque TA is above the memory value TiL (the indication torque TA inputted from the accelerator pedal is above the torque at the constant speed operation). If the accelerator indication torque TA is larger than or equal to the memory value TiL (TA ≧TiL), the program steps to S412 and if the accelerator indication torque TA is below the memory value TiL (TA <TiL), the program returns to S403.

When the program steps to S412, the accelerator indication torque TA is instructed to the drive circuit 10 and the instruction of the fixed vehicle speed Vc is temporarily canceled.

After that, the program goes to S413 at which the vehicle speed VA is detected. Then, the program steps to S414 where the vehicle speed VA is compared with the fixed vehicle speed Vc set at S402. If the vehicle speed VA is larger than or equal to the fixed vehicle speed Vc (VA ≧Vc), the program returns to S405 and if the vehicle speed VA is smaller than the fixed vehicle speed Vc (VA <Vc), the program returns to S403. That is, when a torque is inputted from the accelerator pedal, if the torque is above a torque needed for the constant speed running at the fixed vehicle speed Vc and the vehicle speed is above the fixed vehicle speed Vc, the torque is continued to be inputted through the accelerator pedal. If the vehicle speed goes down below the fixed vehicle speed Vc, the torque is controlled so as to hold the fixed vehicle speed Vc.

Thus, since the speed control according to the third embodiment is performed based on both the torque comparisons at S411 and the vehicle speed comparison at S415, even if the amount of depression of the accelerator pedal varies, the vehicle can be accelerated with the constant speed operation held. Further, even if roads or operating conditions change, it is possible to operate the vehicle at the designated constant vehicle speed and when needed to accelerate the vehicle for passing or lane changing during the constant speed running.

In the embodiments described above, the accelerator indication torque inputted from the accelerator pedal may be replaced with other indication value acquired from a signal of the accelerator pedal sensor. Further, the vehicle speed may be obtained from the motor rotational speed and the gear ratio, although in these embodiments the vehicle speed is obtained from the vehicle speed sensor. Further, in the embodiments, the drive motor is an alternating current induction motor, however other type of electric motors such as an alternating current synchronous motor, a direct current motor and the Like, may be employed.

In summary, not only does the constant speed control system or the cruise control system according to the present invention can hold the vehicle at a designated vehicle speed, but also it enables the vehicle to accelerate for passings or lane changings when a vehicle operator further depresses the accelerator pedal during the constant speed operation and to return to the designated vehicle speed smoothly when he releases the accelerator pedal.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A constant speed running control system of an electric vehicle for automatically operating said electric vehicle at a selectively designated vehicle speed, said vehicle having a driving motor for driving said electric vehicle, a controller for controlling said motor and an accelerator pedal for controlling said motor through said controller, comprising:

motor indication torque calculating means for calculating a motor indication torque needed when said vehicle runs at said designated vehicle speed;

motor indication torque instructing means for inputting said motor indication torque to said controller;

vehicle speed detecting means for detecting a vehicle speed after said motor torque instructing means inputs said motor indication torque;

vehicle speed comparing means for judging whether or not said vehicle speed is equal to or larger than said designated vehicle speed;

accelerator indication torque calculating means for calculating an accelerator indication torque inputted from said accelerator pedal;

accelerator indication torque instructing means for inputting said accelerator indication torque to said controller when said vehicle speed comparing means judges that said vehicle speed is equal to or larger than said designated vehicle speed; and constant speed running instructing means for instructing said motor indication torque to said controller so as to operate said vehicle in accordance with said designated vehicle speed when said vehicle speed comparing means judges that said vehicle speed is smaller than said designated vehicle speed.

2. A constant speed running control system of an electric vehicle for automatically operating said electric vehicle at a selectively designated vehicle speed, said vehicle having a driving motor for driving said electric vehicle, a controller for controlling said motor and an accelerator pedal for controlling said motor through said controller, comprising:

motor indication torque calculating means for calculating a motor indication torque needed when said vehicle runs at said designated vehicle speed;

motor indication torque instructing means for instructing said motor indication torque to said controller;

vehicle speed detecting means for detecting a vehicle speed after said motor torque instructing means inputs said motor indication torque;

accelerator indication torque calculating means for calculating an accelerator indication torque inputted from said accelerator pedal;

indication torque comparing means for judging whether or not said accelerator indication torque is equal to or larger than said motor indication torque;

vehicle speed detecting means for detecting a vehicle speed after said accelerator indication torque is outputted to said controller;

vehicle speed comparing means for judging whether or not said vehicle speed is equal to or larger than said designated vehicle speed;

accelerator indication torque instructing means for inputting said accelerator indication torque to said controller when said vehicle speed comparing means judges that said vehicle speed is equal to or larger than said designated vehicle speed;

constant speed running instructing means for inputting said motor indication torque to said controller so as to operate said vehicle in accordance with said designated vehicle speed when said accelerator indication torque is smaller than said motor indication torque or when said vehicle speed comparing means judges that said vehicle speed is smaller than said designated vehicle speed.

3. A constant speed running control method of operating an electric vehicle at a selectively designated vehicle speed, said vehicle having a driving motor for driving said electric vehicle, a controller for controlling said motor and an accelerator pedal for controlling said motor through said controller, comprising the steps of:

calculating a motor indication torque needed when said vehicle runs at said designated vehicle speed;

inputting said motor indication torque to said controller;

detecting a vehicle speed after said motor indication torque is inputted;

judging whether or not said vehicle speed is equal to or larger than said designated vehicle speed;

calculating an accelerator indication torque inputted from said accelerator pedal;

inputting said accelerator indication torque to said controller when it is judged that said vehicle speed is equal to or larger than said designated vehicle speed; and inputting said motor indication torque to said controller so as to operate said vehicle in accordance with said designated vehicle speed when it is judged that said vehicle speed is smaller than said designated vehicle speed.

4. A constant speed running control method of operating an electric vehicle at a selectively designated vehicle speed, said vehicle having a driving motor for driving said electric vehicle, a controller for controlling said motor and an accelerator pedal for controlling said motor through said controller, comprising the steps of:

calculating a motor indication torque needed when said vehicle runs at said designated vehicle speed;

inputting said motor indication torque to said controller;

detecting a vehicle speed after said motor indication torque is inputted;

calculating an accelerator indication torque inputted from said accelerator pedal;

judging whether or not said accelerator indication torque is equal to or larger than said motor indication torque;

detecting a vehicle speed after said accelerator indication torque is outputted to said controller;

judging whether or not said vehicle speed is equal to or larger than said designated vehicle speed;

inputting said accelerator indication torque to said controller when it is judged that said vehicle speed is equal to or larger than said designated vehicle speed; and inputting said motor indication torque to said controller so as to operate said vehicle in accordance with said designated vehicle speed when said accelerator indication torque is smaller than said motor indication torque or when it is judged that said vehicle speed is smaller than said designated vehicle speed.

* * * * *